United States Patent [19]

Masumoto et al.

[11] Patent Number: 4,572,750

[45] Date of Patent: Feb. 25, 1986

[54] MAGNETIC ALLOY FOR MAGNETIC RECORDING-REPRODUCING HEAD

[75] Inventors: Hakaru Masumoto, Sendai City; Yuetsu Murakami, Izumi City, both of Japan

[73] Assignee: The Foundation: The Research Institute of Electric and Magnetic Alloys, Japan

[21] Appl. No.: 624,290

[22] Filed: Jun. 25, 1984

[30] Foreign Application Priority Data

Jul. 21, 1983 [JP] Japan ............................... 58-131817
Dec. 27, 1983 [JP] Japan ............................... 58-244713

[51] Int. Cl.⁴ .............................................. C04B 35/00

[52] U.S. Cl. ................................ 148/31.55; 420/441; 420/443; 420/444; 420/451; 420/452; 420/455; 420/456; 420/458; 420/459; 420/460

[58] Field of Search .................. 148/31.55, 31.57, 426, 148/427, 428, 429; 420/441, 443, 444, 451, 452, 455, 456, 458, 459, 460

[56] References Cited

U.S. PATENT DOCUMENTS

| | | | |
|---|---|---|---|
| 3,350,199 | 10/1967 | Smith et al. | 420/459 |
| 3,743,550 | 7/1973 | Masumoto et al. | 148/31.55 |
| 3,837,933 | 9/1974 | Masumoto et al. | 148/31.55 |

FOREIGN PATENT DOCUMENTS

| | | | |
|---|---|---|---|
| 3306327 | 9/1983 | Fed. Rep. of Germany | 420/443 |
| 57-123949 | 8/1982 | Japan | 420/456 |

*Primary Examiner*—John P. Sheehan
*Attorney, Agent, or Firm*—Parkhurst & Oliff

[57] ABSTRACT

The disclosed magnetic alloy essentially consists of 60–86% of nickel (Ni), 0.5–14% of niobium (Nb), 0.001–5% in sum of at least one element selected from the group consisting of gold, silver, platinum group elements, gallium, indium, thallium, strontium, and barium, and the balance of iron with a trace of impurities, which alloy renders magnetic properties suitable for recording-and-reproducing head upon specific heat treatment.

4 Claims, 8 Drawing Figures

MAGNETIC ALLOY FOR MAGNETIC RECORDING-REPRODUCING HEAD

BACKGROUND OF THE INVENTION

1. Field of the Invention

This invention relates to a magnetic alloy for magnetic recording-reproducing head and a method for producing the same. More specifically, the invention provides a high-permeability magnetic alloy for magnetic recording-reproducing head and a method of producing the same, which alloy essentially consists of, in percentage by weight, 60–86% of nickel (Ni), 0.5–14% of niobium (Nb), 0.001–5% in sum of at least one element selected from group consisting of less than 5% of gold (Au), less than 3% of silver (Ag), less than 5% platinum group elements (rhenium Re, ruthenium Ru, osmium Os, rhodium Rh, iridium Ir, palladium Pd, platinum Pt), less than 5% of gallium (Ga), less than 5% of indium (In), less than 5% of thallium (Tl), less than 5% of strontium (Sr), and less than 5% of barium (Ba), a small amount of impurities, and the remainder of iron. The alloy of the invention may further contain 0.01–30% by weight of at least one auxiliary ingredient selected from the group consisting of less than 8% of molybdenum (Mo), less than 7% of chromium (Cr), less than 10% of tungsten (W), less than 7% of titanium (Ti), less than 7% of vanadium (V), less than 10% of manganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper. The invention aims at the production a magnetic alloy having a high permeability, a high saturation magnetic flux density, a high hardness, an excellent abrasion resistance, a high forgeability, and a good workability, so that such alloy is particularly suitable for magnetic recording-reproducing head.

2. Description of the Prior Art

As the material for magnetic recording-reproducing heads, permalloy (alloy of Ni-Fe system) with a high permeability and excellent shapability and workability has been widely used. However, permalloy has a shortcoming in that its hardness is rather low, i.e. its Vickers hardness is only about 110, so that a magnetic head made of permalloy is rather quickly abraded by the contact with magnetic tape. Accordingly, there is a pressing need for improving the hardness of conventional alloy material for magnetic recording-reproducing heads.

The inventors have disclosed a high-permeability nickel-iron-niobium (Ni-Fe-Nb) alloy, with a high hardness and an excellent abrasion resistivity, in their U.S. Pat. No. 3,743,550. Continuous effort has been made by the inventors to further improve the properties of magnetic alloys of similar type.

SUMMARY OF THE INVENTION

As a result of various studies and tests on alloys of Ni-Fe base with addition of niobium together with at least one element from the group of gold, silver, platinum group elements, gallium, indium, thallium, strontium, and barium, the inventors have found out that a high hardness is produced in such alloys due to combined effects of niobium and at least one of gold, silver, platinum group elements, gallium, indium, thallium, strontium, and barium, so that such alloys are highly resistive against abrasion and suitable for magnetic recording-reproducing heads.

The inventors also found that magnetic and other physical properties of the above Ni-Fe alloys could be further improved by adding 0.01–30% by weight in total of at least one element from the group of molybdenum (Mo), chromium (Cr), tungsten (W), titanium (Ti), vanadium (V), manganese (Mn), germanium (Ge), zirconium (Zr), rare earth elements, tantalum (Ta), beryllium (Be), boron (B), aluminum (Al), silicon (Si), hafnium (Hf), tin (Sn), antimony (Sb), cobalt (Co), and copper (Cu). The alloys thus found have a high permeability and a high hardness to provide excellent abrasion resistivity, and yet the alloys are easy to forge and work.

A preferred, but not restrictive, composition of the alloy of the invention in percentage by weight is as follows: namely, major ingredients, 0.01–25% of at least one auxiliary ingredient, a small amount of impurities, and the remainder of iron; said major ingredients consisting of 73–84.8% of nickel (Ni), 1–12% of niobium (Nb), and 0.005–5% in sum and less than 3% each of at least one element selected from group consisting of gold (Au), silver (Ag), platinum group elements, gallium (Ga), indium (In), thallium (Tl), strontium (Sr), and barium (Ba); said auxiliary ingredient being selected from the group consisting of less than 6% of molybdenum (Mo), less than 5% of chromium (Cr), less than 7% of tungsten (W), less than 5% of titanium (Ti), less than 4% of vanadium (V), less than 7% of manganese (Mn), less than 5% of germanium (Ge), less than 3% of zirconium (Zr), less than 3% of rare earth elements, less than 7% of tantalum (Ta), less than 2% of beryllium (Be), less than 0.7% of boron (B), less than 3% of aluminum (Al), less than 3% of silicon (Si), less than 3% of hafnium (Hf), less than 3% of tin (Sn), less than 3% of antimony (Sb), less than 7% of cobalt (Co), and less than 20% of copper (Cu).

The alloy of the above preferred composition reveals a high permeability and a high hardness when processed by the following heat treatment: namely, the alloy is heated at a high temperature above the recrystallizing point thereof, i.e. above 600° C., preferably above 800° C., but below the melting point thereof in a non-oxidizing atmosphere or in vacuo for a period longer than one minute but shorter than 100 hours depending on the composition thereof, so as to thoroughly remove the work station at the high temperature and to effect solution treatment for homogenizing the structure; and the thus heated alloy is once cooled a temperature in the proximity of the order-disorder transfomation point thereof, at about 600° C., held at this temperature for a short while until the entire alloy structure reach a uniform temperature, and then cooled to room temperature from the temperature above the order-disorder transformation point at a rate of 100° C./sec to 1° C./hour depending on the composition. The thus cooled alloy may be reheated at a temperature below the order-disorder transformation point (about 600° C.) thereof for a period longer than one minute but shorter than 100 hours depending on the composition, and then cooled again.

As to the cooling from the temperature for the solution treatment to the temperature above the order-disorder transformation point (about 600° C.), the rate of cooling does not cause any substantial effects on the resultant magnetic properties of the alloy, whether cooled quick or slow. However, the rate of cooling below the order-disorder transformation point seriously affects the physical properties of the alloy. Thus, if the alloy is cooled from the temperature above the order-disorder point at a suitable rate depending on its composition in a range of 100° C./sec to 1° C./hour, preferable degree of order is produced so as to render excellent magnetic properties. If the rate of cooling is faster than 100° C./sec, the ordered lattice is not produced so well and resultant degree of order is small, producing rather poor magnetic properties. However, if the alloy with the small degree of order is reheated below its order-disorder transformation point in a temperature range of 200° C. to 600° C. and then cooled again, the degree of order is advanced and the magnetic properties are improved. On the other hand, if the rate of cooling from the temperature above the order-disorder transformation point is slow and below 1° C./hour, the degree of order is advanced too far, and the magnetic properties become inferior.

In short, the alloy with the composition according to the invention renders excellent magnetic properties if thorough solution treatment is applied to it at a temperature above 600° C., preferably above 800° C., but below its melting point and then it is cooled at a suitable rate for producing a proper degree of order. When the rate of cooling is too fast and degree of order is too small, the alloy can be reheated in a temperature range of 200° C. to 600° C. below the order-disorder transformation point, so as to adjust the degree of order for improving its magnetic properties to a considerable extent.

In general, if the temperature for the heat treatment is high, the duration of the heat treatment should be short, while if the temperature for the heat treatment is low, the duration of the heat treatment must be long. When the mass of the alloy is large, the heat treating time must be long, while if the alloy mass is small, the heat treating time must be short, as a matter of course.

The suitable rate of cooling from about 600° C. to room temperature for producing the highest value of the permeability for each alloy of the invention varies considerably depending on the composition thereof. However, such suitable rate of cooling is usually small, e.g., about the cooling rate in a furnace. In fact, the slow cooling is advantageous for practical applications. For instance, in the manufacture of magnetic recording-reproducing heads, the heat treatment of shaped or machined works for removing the work strain is preferably carried out in a non-oxidizing atmosphere or in vacuo, while paying care to keep the shape of the work intact and to avoid surface oxidation, and the slow cooling of the invention to render excellent magnetic properties is particularly suitable for the above careful heat treatment for removing the work strain.

The method of producing the magnetic alloy for magnetic recording-reproducing head according to the invention will be described now in the order of steps of the heat treatment.

To produce the alloy of the invention, a suitable amount of a mixture of the major ingredients is melted by a suitable furnace in air, or preferably in a non-oxidizing atmosphere or in vacuo, the major ingredients consisting of, in percentage by weight, 60-86% of nickel (Ni), 0.5-14% of niobium (Nb), 0.001-5% in sum of at least one element selected from the group consisting of less than 5% of gold (Au), less than 3% of silver (Ag), less than 5% of platinum gold elements, less than 5% of gallium (Ga), less than 5% of indium (In), less than 5% of thallium (Tl), less than 5% of strontium (Sr), and less than 5% of barium (Ba), and the remainder of iron. Impurities are removed from the melt of the major ingredients as far as possible, by adding a small amount of deoxidizing agent and desulfurizing agent, such as manganese (Mg), silicon (Si), aluminum (Al), titanium (Ti), boron (B), calcium alloy, magnesium alloy, and the like. An alloy melt of homogeneous composition is prepared by thoroughly agitating the molten mixture of the ingredients after the removal of the impurities.

A suitable amount of one or more auxiliary ingredients in a range of 0.01-30% by weight in total may be added in the molten mixture of major ingredients and the mixture is thoroughly agitated after the addition, so as to produce an alloy melt with homogeneous composition, the auxiliary ingredient being at least one element selected from the group consisting of less than 8% of molybdenum (Mo), less than 7% of chromium (Cr), less than 10% of tungsten (W), less than 7% of titanium (Ti), less than 7% of vanadium (V), less than 10% of manganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper.

The alloy melt thus prepared with or without the auxiliary ingredients is poured into a mould of suitable size and shape, so as to produce a sound ingot. The ingot is worked, for instance by forging at room temperature or at an elevated temperature or by hot- or cold-rolling, so as to shape it into a desired form, such as a thin sheet with a thickness of 0.1 mm. Alloy pieces of desired shape and dimensions are made, for instance by punching the thus prepared thin sheet. The alloy piece is heated in a suitable non-oxidizing atmosphere such as hydrogen or in vacuo at a temperature above the recrystallizing temperature thereof, namely above 600° C., preferably above 800° C., but below the melting point thereof, for a period of longer than one minute but shorter than about 100 hours depending on the composition. Then, the alloy piece is cooled at a suitable rate depending on the composition, the cooling rate being in a range of 100° C./sec to 1° C./hour, preferably 10° C./sec to 10° C./hour.

After the above heat treatment, alloys of certain compositions of the invention may be reheated at a temperature below about 600° C. (a temperature below the order-disorder transformation point), preferably in a range of 200° C. to 600° C., for a period of longer than one minute but shorter than about 100 hours, and then cooled again.

BRIEF DESCRIPTION OF THE DRAWINGS

For a better understanding of the invention, reference is made to the accompanying drawings, in which.

DESCRIPTION OF THE PREFERRED EMBODIMENTS

Example 1

Figure 1:
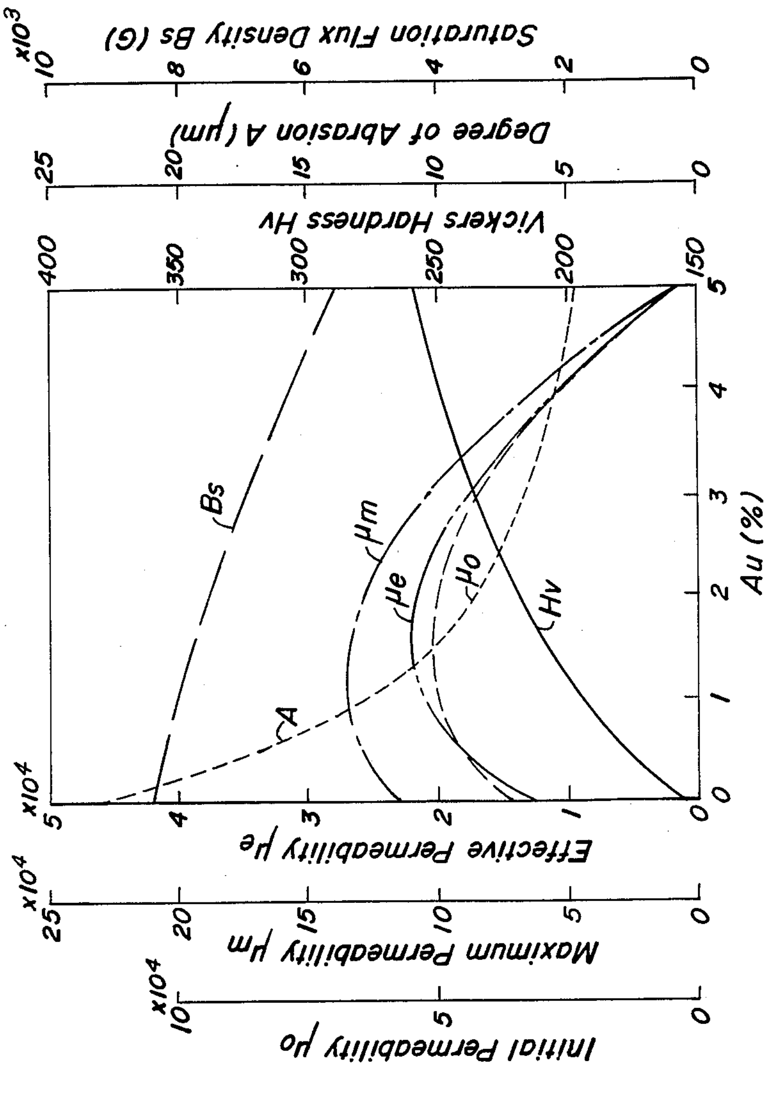
FIG. 1 is a graph of the physical properties of (79.8% of Ni)-Fe-(5% Nb)-Au alloy, showing the variation of the initial permeability, the maximum permeability, the effective permeability at 1 kHz, the saturation flux density, the hardness, and the degree of abrasion of the alloy for different concentrations of gold therein.

Alloy Specimen No. 7 (Ni=79.8%, Fe=13.8%, Nb=5.0%, Au=1.4%)

As starting materials, electrolytic nickel with a purity of 99.8%, electrolytic iron with a purity of 99.9% , niobium with a purity of 99.8%, and gold with a purity of 99.9% were used. To prepare the specimen, 800 g in total of the starting materials were placed in an alumina crucible, and after melting them by an electric high-frequency induction furnace in vacuo, the melt was thoroughly agitated so as to provide a homogeneous alloy melt. The alloy melt was poured into a mould having a cavity of 25 mm in diameter of 170 mm in height, so as to form an ingot, which was forged at about 1,000° C. into 7 mm thick alloy sheets. The thickness of the alloy sheets was reduced to 1 mm by hot rolling at a temperature in a range of about 600° C. to 900° C., and it was further reduced to 0.1 mm by cold rolling at room temperature. Core sheets for magnetic head and annular test pieces with an outer diameter of 45 mm and an inner diameter of 33 mm were punched out from the 0.1 mm thick alloy sheets thus prepared.

Various heat treatments as shown in Table 1 were applied to the core sheets and the annular test pieces, and the magnetic properties and Vickers hardness of the alloy specimen were measured by using the annular test pieces. A magnetic head was prepared by the core sheets so as to measure the degree of abrasion after 300 hours of running engagement with a magnetic tape by a TARRYSURF surface roughness tester. The result is shown in Table 1.

TABLE 1

| Heat treatment | Initial permeability $\mu_o$ | Maximum permeability $\mu_m$ | Effective permeability $\mu_e$, 1 khz | Residual flux density (G) | Coercive force (Oe) | Saturation flux density (G) | Hardness Hv | Degree of abrasion ($\mu$m) |
|---|---|---|---|---|---|---|---|---|
| Heated at 700° C. in $H_2$ for 10 hours, cooled to 600° C. in furnace and to room temperature at 240° C./hr | 19,700 | 78,500 | 15,800 | 3,340 | 0.0280 | 7,100 | 218 | 8.3 |
| After immediately above treatment, reheated at 420° C. in vacuo for 8 hours | 17,200 | 72,000 | 14,300 | 3,360 | 0.0292 | 7,120 | 220 | 8.0 |
| Heated at 900° C. in $H_2$ for 5 hours, cooled to 600° C. in furnace and to room temperature at 400° C./hr | 38,000 | 126,000 | 18,200 | 3,310 | 0.0180 | 7,140 | 212 | 8.7 |
| After immediately above treatment, reheated at 400° C. in vacuo for 3 hours | 41,200 | 128,000 | 19,300 | 3,230 | 0.0153 | 7,150 | 215 | 8.5 |
| Heated at 1,050° C. in $H_2$ for 8 hours, cooled to 600° C. in furnace and to room temperature at 400° C./hr | 45,300 | 127,000 | 20,100 | 3,280 | 0.0149 | 7,150 | 210 | 9.2 |
| After immediately above treatment, reheated at 400° C. in vacuo for 1 hour | 47,000 | 130,500 | 21,500 | 3,290 | 0.0138 | 7,160 | 215 | 9.0 |
| Heated at 1,150° C. in $H_2$ for 2 hours, cooled to 600° C. in furnace and to room temperature at 200° C./hr | 51,000 | 132,700 | 20,600 | 3,260 | 0.0132 | 7,170 | 207 | 9.6 |
| After immediately above treatment, reheated at 400° C. in vacuo for 5 hours | 51,300 | 134,400 | 20,400 | 3,230 | 0.0122 | 7,190 | 210 | 9.3 |
| Heated at 1,250° C. in $H_2$ for 2 hours, cooled to 600° C. in furnace and to room temperature at 100° C./hr | 51,600 | 136,200 | 22,000 | 3,210 | 0.0110 | 7,200 | 206 | 10.5 |
| After immediately above treatment, reheated at 420° C. in vacuo for 2 hours | 51,200 | 134,000 | 22,100 | 3,240 | 0.0137 | 7,210 | 210 | 10.0 |

Example 2

Alloy Specimen No. 38 (Ni=79.6%, Fe=13.9%, Nb=6.0%, Rh=0.5%)

As starting materials, nickel, iron and niobium with the same purities as those of Example 1 were used together with rhodium with a purity of 99.8%. Test pieces and a magnetic head were prepared in the same manner as those of Example 1. After various heat treatments, the properties of the Alloy Specimen No. 38 were measured. The result is shown in Table 2.

TABLE 2

| Heat treatment | Initial perme-ability $\mu_o$ | Maximum perme-ability $\mu_m$ | Effective perme-ability $\mu_e$, 1 khz | Residual flux density (G) | Coercive force (Oe) | Saturation flux density (G) | Hardness Hv | Degree of abrasion (μm) |
|---|---|---|---|---|---|---|---|---|
| Heated at 900° C. in $H_2$ for 5 hours, cooled to 600° C. in furnace and to room temperature at 240° C./hr | 25,000 | 85,200 | 16,800 | 3,420 | 0.0167 | 7,100 | 215 | 8.6 |
| After immediately above treatment, reheated at 400° C. in vacuo for 30 minutes | 21,600 | 84,000 | 15,300 | 3,440 | 0.0183 | 7,090 | 218 | 9.0 |
| Heated at 1,150° C. in $H_2$ for 2 hours, cooled to 600° C. in furnace and to room temperature at 800° C./hr | 37,200 | 126,000 | 18,400 | 3,400 | 0.0162 | 7,110 | 206 | 9.1 |
| After immediately above treatment, reheated at 400° C. in vacuo for 2 hours | 49,500 | 143,000 | 20,800 | 3,380 | 0.0145 | 7,110 | 210 | 9.5 |
| Heated at 1,250° C. in $H_2$ for 2 hours, cooled to 600° C. in furnace and to room temperature at 600° C./hr | 46,200 | 135,200 | 20,100 | 3,360 | 0.0135 | 7,130 | 197 | 10.0 |
| After immediately above treatment, reheated at 400° C. in vacuo for 1 hour | 52,500 | 145,000 | 21,800 | 3,380 | 0.0117 | 7,150 | 199 | 9.7 |
| Heated at 1,250° C. in $H_2$ for 2 hours, cooled to 600° C. in furnace and to room temperature at 600° C./hr | 56,300 | 157,000 | 22,000 | 3,340 | 0.0115 | 7,150 | 195 | 10.8 |
| After immediately above treatment, reheated at 380° C. in vacuo for 2 hours | 52,000 | 153,500 | 23,000 | 3,300 | 0.0130 | 7,130 | 198 | 10.5 |
| Heated at 1,350° C. in $H_2$ for 3 hours, cooled to 600° C. in furnace and to room temperature at 240° C./hr | 53,800 | 149,200 | 23,800 | 3,320 | 0.0118 | 7,130 | 193 | 11.0 |
| After immediately above treatment, reheated at 400° C. in vacuo for 1 hour | 54,700 | 154,000 | 22,500 | 3,310 | 0.0110 | 7,150 | 197 | 10.7 |

Example 3

Alloy Specimen No. 20 (Ni=79.8%, Fe=13.7%, Nb=5.0%, Ba=1.5%)

As starting materials, nickel, iron and niobium with the same purities as those of Example 1 were used together with barium with a purity of 99.5%. Test pieces and a magnetic head were prepared in the same manner as those of Example 1. After various heat treatments, the properties of the Alloy Specimen No. 20 were measured. The result is shown in Table 3.

TABLE 3

| Heat treatment | Initial perme-ability $\mu_o$ | Maximum perme-ability $\mu_m$ | Effective perme-ability $\mu_e$, 1 khz | Residual flux density (G) | Coercive force (Oe) | Saturation flux density (G) | Hardness Hv | Degree of abrasion (μm) |
|---|---|---|---|---|---|---|---|---|
| Heated at 700° C. in $H_2$ for 10 hours, cooled to 600° C. in furnace and to room temperature at 400° C./hr | 24,700 | 85,700 | 11,600 | 2,650 | 0.0310 | 7,870 | 235 | 7.5 |
| After immediately above treatment, reheated at 450° C. in vacuo for 3 hours | 28,600 | 91,000 | 12,700 | 2,710 | 0.0284 | 7,880 | 240 | 7.3 |
| Heated at 900° C. in $H_2$ for 5 hours, cooled to 600° C. in furnace and to room temperature at 800° C./hr | 36,400 | 102,000 | 13,800 | 2,760 | 0.0203 | 7,890 | 220 | 9.0 |
| After immediately above treatment, reheated at 400° C. in vacuo for 5 hours | 38,500 | 110,000 | 14,200 | 2,780 | 0.0184 | 7,900 | 224 | 8.8 |
| Heated at 1,050° C. in $H_2$ for 3 hours, cooled to 600° C. in furnace and to room temperature at 800° C./hr | 45,700 | 129,600 | 15,400 | 2,980 | 0.0173 | 7,910 | 212 | 11.0 |
| After immediately above treatment, reheated at 400° C. in vacuo for 2 hours | 47,300 | 131,400 | 16,000 | 2,950 | 0.0161 | 7,910 | 216 | |
| Heated at 1,150° C. in $H_2$ for 2 hours, cooled to 600° C. in furnace and to room temperature at 800° C./hr | 48,200 | 134,000 | 18,600 | 2,990 | 0.0152 | 7,910 | 207 | 13.2 |
| After immediately above treatment, reheated at 400° C. in vacuo for 3 hours | 49,600 | 139,400 | 18,800 | 2,990 | 0.0147 | 7,910 | 213 | 14.1 |
| Heated at 1,250° C. in $H_2$ for 2 hours, cooled to 600° C. in furnace and to room temperature at 800° C./hr | 53,000 | 138,200 | 19,000 | 3,050 | 0.0136 | 7,920 | 198 | 15.5 |
| After immediately above treatment, reheated at 400° C. in vacuo for 2 hours | 53,800 | 141,000 | 19,800 | 3,030 | 0.0125 | 7,930 | 205 | 16.0 |

Table 4A, Table 5A, and Table 6A show compositions of typical alloy specimens used in the experiments. The alloy specimens were heated in hydrogen at 1,250° C. for 2 hours, and cooled from 600° C. to room temperature at various rates. Some of the alloy specimens were reheated at a temperature below 600° C., and cooled again. Table 4B, Table 5B, and Table 6B show the physical properties of the thus treated typical alloy specimens, which properties were measured at room temperature.

TABLE 4A

| Alloy specimen No. | Composition (% by weight), with remainder of iron | | | | | | | |
|---|---|---|---|---|---|---|---|---|
| | Ni | Nb | Au | Ag | Platinum group element | Sr | Ba | Auxiliary element |
| 7 | 79.8 | 5.0 | 1.4 | — | — | — | — | — |
| 15 | 79.2 | 3.0 | 3.0 | — | — | — | — | — |
| 23 | 79.5 | 8.0 | 1.0 | 0.5 | — | — | — | — |
| 30 | 80.0 | 5.0 | — | — | R3 0.3, Os 0.2 | — | — | — |
| 38 | 79.6 | 6.0 | — | — | Rh 0.7 | — | — | — |
| 46 | 80.2 | 4.0 | — | — | Ru 0.5, Pd 0.5 | — | — | — |
| 55 | 80.0 | 5.0 | — | — | Ir 0.5, Pt 0.5 | — | — | — |
| 63 | 79.5 | 2.7 | — | — | — | 1.5 | 0.5 | — |
| 105 | 80.6 | 7.0 | 0.5 | — | Re 0.5 | — | — | Mo 2.0, Mn 0.5 |
| 117 | 80.2 | 5.0 | — | — | Pt 0.5 | 0.5 | — | Mo 1.0, Ti 1.0, Mn 0.3 |
| 129 | 81.5 | 6.0 | 1.0 | — | Ir 0.5 | — | — | Cr 1.0 |
| 136 | 81.0 | 4.0 | — | — | Rh 0.3, Pd 0.3 | — | — | Cr 1.0, Zr 0.5, Co 1.0 |
| 148 | 75.0 | 6.0 | — | — | Os 0.3, Ru 0.2 | — | — | W 7.0, Al 0.5 |
| 156 | 76.0 | 2.5 | — | — | Pt 0.3 | — | — | W 5.0, Al 0.3, Sb 0.5 |
| 163 | 77.0 | 5.0 | — | — | Re 0.2, Rh 0.3 | — | — | V 4.0, La 0.5 |
| 175 | 77.5 | 6.0 | 1.0 | — | — | — | — | V 3.0, Si 1.0 |
| 183 | 81.3 | 5.0 | — | 0.3 | — | — | 0.5 | Ge 2.0, B 0.1 |
| 197 | 81.0 | 9.0 | 0.7 | 0.2 | Pt 0.3 | 0.5 | — | Ge 2.0, Ce 0.3 |
| 208 | 75.0 | 6.0 | — | 0.2 | Pd 0.7 | — | — | Ta 7.0, Be 0.3 |
| 216 | 76.5 | 7.0 | 0.5 | — | — | — | 0.5 | Ta 5.0, Ga 0.5 |
| 230 | 68.0 | 2.0 | — | 0.2 | Pt 0.3 | — | — | Cu 15.0, Hf 0.5 |
| 238 | 65.0 | 4.0 | — | — | Os 0.5 | — | — | Cu 17.0, In 1.0 |
| 249 | 80.7 | 7.0 | — | — | Pd 1.0 | — | — | Mo 2.0, Ti 0.5 |
| 258 | 80.3 | 5.0 | 0.5 | — | Re 0.5 | — | — | Mo 1.5, Sn 0.5 |
| Permalloy | 78.5 | — | — | — | — | — | — | — |

TABLE 4B

| Alloy specimen No. | Cooling rate (°C./hr) | Reheating temper-ature, (°C.) | Reheating time (hr) | Initial perme-ability $\mu_o$ | Maximum perme-ability $\mu_m$ | Effective perme-ability $\mu_e$, 1 khz | Residual flux density (G) | Coercive force (Oe) | Saturation flux density (G) | Hardness Hv | Degree of abrasion (μm) |
|---|---|---|---|---|---|---|---|---|---|---|---|
| 7 | 100 | — | — | 51,600 | 136,200 | 22,000 | 3,210 | 0.0110 | 7,200 | 206 | 10.5 |
| 15 | 400 | 400 | 1 | 42,000 | 113,000 | 21,500 | 3,140 | 0.0205 | 7,300 | 211 | 7.7 |
| 23 | 800 | — | — | 48,500 | 131,000 | 21,700 | 2,730 | 0.0160 | 5,820 | 182 | 11.3 |
| 30 | 200 | — | — | 53,700 | 135,800 | 22,500 | 3,250 | 0.0124 | | | |
| 7,540 | 210 | 8.0 | | | | | | | | | |
| 38 | 400 | 380 | 2 | 56,300 | 157,000 | 23,000 | 3,170 | 0.0112 | 7,400 | 198 | 10.5 |
| 46 | 400 | — | — | 56,000 | 138,200 | 22,800 | 3,350 | 0.0113 | 7,830 | 208 | 10.2 |
| 55 | 200 | — | — | 52,400 | 132,000 | 22,100 | 3,420 | 0.0130 | 7,910 | 210 | 9.5 |
| 63 | 500 | — | — | 48,800 | 117,000 | 21,300 | 3,680 | 0.0152 | 7,860 | 190 | 8.0 |
| 105 | 400 | 420 | 0.5 | 113,000 | 368,000 | 36,400 | 2,480 | 0.0035 | 6,100 | 225 | 4.2 |
| 117 | 100 | — | — | 89,300 | 285,000 | 32,000 | 2,210 | 0.0064 | 5,830 | 223 | 4.5 |
| 129 | 200 | — | — | 96,200 | 273,000 | 35,700 | 2,350 | 0.0047 | 5,780 | 230 | 3.3 |
| 136 | 800 | 400 | 2 | 85,000 | 238,000 | 33,500 | 2,400 | 0.0066 | 6,210 | 218 | 4.5 |
| 148 | 400 | — | — | 97,000 | 281,000 | 31,900 | 2,130 | 0.0045 | 5,500 | 226 | 4.3 |
| 156 | 1,500 | — | — | 75,300 | 236,000 | 30,700 | 2,870 | 0.0082 | 7,020 | 220 | 4.8 |
| 163 | 200 | 350 | 5 | 88,000 | 272,000 | 29,600 | 2,830 | 0.0057 | 6,160 | 232 | 3.0 |
| 175 | 100 | — | — | 95,700 | 293,000 | 32,000 | 2,270 | 0.0051 | 5,910 | 235 | 2.8 |
| 183 | 200 | — | — | 84,000 | 236,000 | 31,400 | 2,720 | 0.0074 | 6,550 | 215 | 4.5 |
| 197 | 100 | 400 | 3 | 92,000 | 253,000 | 34,300 | 2,050 | 0.0048 | 5,210 | 248 | 2.2 |
| 208 | 200 | 450 | 2 | 80,500 | 227,000 | 28,700 | 2,260 | 0.0076 | 5,600 | 231 | 4.2 |
| 216 | 100 | — | — | 98,000 | 276,000 | 31,700 | 2,180 | 0.0054 | 5,420 | 227 | 4.7 |
| 230 | 1,500 | — | — | 86,400 | 203,000 | 27,200 | 2,930 | 0.0064 | 6,200 | 213 | 4.8 |
| 238 | 800 | — | — | 84,000 | 227,000 | 29,400 | 2,860 | 0.0072 | 6,080 | 218 | 4.6 |
| 249 | 200 | — | — | 101,000 | 273,000 | 34,600 | 2,430 | 0.0037 | 5,730 | 224 | 4.7 |
| 258 | 400 | 400 | 2 | 82,000 | 238,000 | 28,400 | 2,460 | 0.0075 | 5,800 | 228 | 4.5 |
| Permalloy | 200* | — | — | 80,000 | 86,000 | 3,700 | 4,600 | 0.0550 | 10,600 | 110 | 92.5 |

*°C./sec

TABLE 5A

| Alloy specimen No. | Composition (% by weight), with remainder iron | | | | | |
|---|---|---|---|---|---|---|
| | Ni | Nb | Ga | In | Tl | Auxiliary element |
| 307 | 79.8 | 5.0 | 0.4 | — | — | — |
| 313 | 79.6 | 6.0 | — | 0.5 | — | — |
| 320 | 79.5 | 6.7 | — | — | 0.6 | — |
| 326 | 79.2 | 4.0 | 0.3 | 0.5 | — | — |
| 332 | 79.0 | 3.6 | — | 0.5 | 0.5 | — |
| 338 | 78.8 | 2.5 | 0.4 | 0.4 | 0.6 | — |
| 345 | 78.5 | 1.2 | 0.1 | 0.5 | 1.0 | — |
| 355 | 79.8 | 8.5 | 0.3 | — | — | Mo 1.5, Mn 0.3 |
| 360 | 79.5 | 7.0 | 0.2 | 0.3 | — | Mo 1.0, Ti 0.7, Mn 0.5 |
| 367 | 79.2 | 4.5 | 0.1 | 0.2 | 0.5 | Mo 2.5, Ti 0.5, Mn 1.5 |

TABLE 5A-continued

| Alloy specimen No. | Composition (% by weight), with remainder iron Ni | Nb | Ga | In | Tl | Auxiliary element | | |
|---|---|---|---|---|---|---|---|---|
| 381 | 81.0 | 7.5 | — | 0.5 | — | Cr 0.3 | | |
| 388 | 80.5 | 5.5 | — | 0.1 | 0.5 | Cr 1.0, | Zr 0.5, | Sc 0.3 |
| 394 | 79.6 | 7.0 | 0.2 | 0.4 | — | Cr 0.5, | Sc 0.5 | |
| 400 | 75.3 | 6.5 | — | — | 1.0 | W 2.5 | | |
| 405 | 78.0 | 3.5 | — | 0.5 | 0.3 | W 4.5, | Be 0.15 | |
| 412 | 79.3 | 8.0 | 0.05 | 0.5 | — | W 1.0, | Y 0.3 | |
| 420 | 80.5 | 5.0 | 0.5 | — | — | V 1.5, | Al 0.5 | |
| 426 | 80.7 | 6.0 | — | 0.03 | 0.7 | Al 0.5, | B 0.1 | |
| 433 | 79.2 | 2.8 | 0.02 | 0.4 | 0.3 | V 3.0, | Al 0.5, | B 0.2 |
| 440 | 74.5 | 5.5 | 0.3 | 0.2 | 0.05 | Ta 8.0 | | |
| 445 | 76.7 | 4.6 | — | 0.5 | 0.1 | Ta 5.0, | Si 0.7 | |
| 452 | 78.0 | 6.5 | — | — | 0.3 | Ta 3.0, | Sb 0.3 | |
| 460 | 79.3 | 8.6 | 0.5 | 0.02 | 0.02 | Ge 2.2, | Sn 0.2 | |
| 467 | 79.9 | 10.5 | — | 0.04 | 0.1 | Ge 1.0, | Co 1.5 | |
| 473 | 78.3 | 4.5 | 0.3 | 0.1 | 0.1 | Cu 6.2, | Hf 0.7 | |
| 482 | 79.2 | 7.5 | — | 0.5 | — | Cu 3.0, | La 0.3 | |

TABLE 5B

| Alloy specimen No. | Cooling rate (°C./hr) | Reheating temper-ature, (°C.) | Reheating time (hr) | Initial perme-ability $\mu_o$ | Maximum perme-ability $\mu_m$ | Effective perme-ability $\mu_e$, 1 kHz | Residual flux density (G) | Coercive force (Oe) | Saturation flux density (G) | Hardness Hv | Degree of abrasion ($\mu$m) |
|---|---|---|---|---|---|---|---|---|---|---|---|
| 307 | 400 | 400 | 2 | 58,000 | 162,000 | 23,000 | 2,240 | 0.0087 | 7,210 | 210 | 6.8 |
| 313 | 240 | — | — | 58,300 | 167,000 | 22,000 | 2,340 | 0.0105 | 7,050 | 217 | 7.6 |
| 320 | 240 | — | — | 63,500 | 172,000 | 23,800 | 2,320 | 0.0085 | 6,830 | 222 | 7.6 |
| 326 | 800 | 450 | 1 | 52,400 | 157,400 | 20,700 | 3,260 | 0.0110 | 8,050 | 215 | 7.9 |
| 332 | 600 | 420 | 3 | 46,000 | 152,000 | 18,600 | 3,340 | 0.0124 | 8,200 | 212 | 8.0 |
| 338 | 240 | — | — | 33,800 | 140,500 | 17,700 | 3,500 | 0.0156 | 8,260 | 210 | 8.2 |
| 345 | 400 | — | — | 23,000 | 127,400 | 16,300 | 3,720 | 0.0175 | 8,340 | 180 | 15.0 |
| 355 | 100 | — | — | 112,000 | 436,000 | 38,400 | 2,010 | 0.0031 | 5,620 | 252 | 3.7 |
| 360 | 400 | 380 | 3 | 104,600 | 382,000 | 32,700 | 2,030 | 0.0035 | 5,700 | 255 | 3.5 |
| 367 | 100 | — | — | 88,000 | 251,000 | 28,200 | 2,310 | 0.0058 | 6,130 | 250 | 3.7 |
| 381 | 240 | — | — | 106,200 | 364,000 | 34,000 | 2,200 | 0.0033 | 5,720 | 250 | 3.8 |
| 388 | 240 | 400 | 2 | 86,500 | 274,700 | 26,300 | 2,410 | 0.0060 | 6,020 | 247 | 3.9 |
| 394 | 400 | — | — | 97,200 | 385,000 | 28,100 | 2,320 | 0.0043 | 5,650 | 248 | 3.9 |
| 400 | 400 | 400 | 1 | 95,400 | 326,000 | 26,400 | 2,060 | 0.0045 | 5,840 | 245 | 3.9 |
| 405 | 240 | — | — | 72,600 | 271,500 | 25,200 | 2,250 | 0.0070 | 6,220 | 242 | 4.1 |
| 412 | 240 | — | — | 97,000 | 343,000 | 27,800 | 2,350 | 0.0043 | 5,920 | 263 | 3.0 |
| 420 | 800 | 420 | 3 | 88,200 | 274,000 | 28,300 | 2,420 | 0.0058 | 6,240 | 255 | 3.5 |
| 426 | 400 | 400 | 2 | 91,000 | 302,000 | 31,200 | 2,380 | 0.0046 | 6,200 | 257 | 3.3 |
| 433 | 100 | — | — | 74,000 | 255,000 | 26,900 | 2,470 | 0.0075 | 6,850 | 240 | 4.3 |
| 440 | 240 | — | — | 102,000 | 337,000 | 34,200 | 2,330 | 0.0036 | 5,910 | 262 | 3.1 |
| 445 | 240 | 400 | 3 | 86,400 | 272,000 | 28,800 | 2,260 | 0.0062 | 5,820 | 245 | 4.0 |
| 452 | 240 | — | — | 85,200 | 254,000 | 27,200 | 2,400 | 0.0065 | 6,100 | 243 | 3.9 |
| 460 | 100 | — | — | 87,300 | 291,000 | 29,200 | 2,170 | 0.0060 | 5,640 | 265 | 2.8 |
| 467 | 100 | — | — | 92,500 | 272,000 | 31,600 | 2,200 | 0.0051 | 5,700 | 270 | 2.6 |
| 473 | 400 | — | — | 87,000 | 254,000 | 28,600 | 2,440 | 0.0064 | 6,260 | 252 | 3.4 |
| 482 | 400 | 400 | 1 | 91,000 | 320,000 | 30,300 | 2,270 | 0.0053 | 5,810 | 245 | 4.1 |

TABLE 6A

| Alloy specimen No. | Composition (% by weight), with remainder of iron Ni | Nb | Other major gredient element | | | Auxiliary element | |
|---|---|---|---|---|---|---|---|
| 500 | 79.5 | 9.0 | Sr 0.7 | | | — | |
| 510 | 79.8 | 5.0 | Ba 1.5 | | | — | |
| 522 | 82.0 | 4.0 | Ba 0.6 | | | — | |
| 534 | 79.0 | 3.0 | Au 1.0, | Ga 0.5, | Pd 1.0 | — | |
| 540 | 80.5 | 7.5 | Pt 1.0, | Ag 0.5, | In 0.5 | — | |
| 547 | 80.0 | 6.0 | Sr 0.5, | In 1.0, | Rh 0.5 | — | |
| 556 | 80.2 | 4.5 | Ba 0.5, | Tl 1.0, | Ru 0.5 | — | |
| 563 | 79.5 | 6.0 | Sr 0.5 | | | Cr 1.0, | Ti 0.5 |
| 570 | 80.5 | 5.0 | Sr 0.5, | Ba 0.7 | | Mo 1.0, | Ge 0.5 |
| 581 | 81.5 | 3.5 | Tl 0.7, | Sr 0.5, | Pt 0.5 | W 2.0, | Al 0.5 |

TABLE 6A-continued

| Alloy specimen No. | Composition (% by weight), with remainder of iron Ni | Nb | Other major gredient element | | Auxiliary element | |
|---|---|---|---|---|---|---|
| 589 | 79.0 | 3.0 | Au 1.0, | Ba 1.0 | Ti 0.5, | Mn 1.0 |
| 596 | 81.0 | 4.0 | Os 0.5, | In 1.0 | V 1.0, | B 0.2 |
| 605 | 80.5 | 2.5 | Ag 0.5, | Ir 0.5 | Zr 0.5, | Si 1.0 |
| 613 | 77.0 | 3.5 | Ga 1.0, | Au 0.5 | Ta 3.0, | Ce 0.5 |
| 620 | 78.5 | 5.0 | Sr 1.0, | Re 0.5 | W 3.0, | Be 0.3 |
| 627 | 78.0 | 7.0 | Ba 1.0 | | Cu 5.0, | Sb 0.7 |
| 635 | 79.0 | 8.0 | Ga 0.5, | Ag 0.5 | Mo 1.0, | Co 1.0 |
| 640 | 78.0 | 2.0 | Ru 1.0, | In 1.0 | Cr 1.0, | Sn 0.5 |
| 648 | 76.0 | 4.5 | Sr 0.5, | Ba 0.5 | V 1.0, | Hf 0.5 |
| 655 | 72.5 | 3.0 | Ba 0.7, | Tl 0.5 | Cu 10.0, | La 0.5 |

TABLE 6B

| Alloy specimen No. | Cooling rate (°C./hr) | Reheating temper-ature, (°C.) | Reheating time (hr) | Initial perme-ability $\mu_o$ | Maximum perme-ability $\mu_m$ | Effective perme-ability $\mu_e$, 1 kHz | Residual flux density (G) | Coercive force (Oe) | Saturation flux density (G) | Hardness Hv | Degree of abrasion ($\mu$m) |
|---|---|---|---|---|---|---|---|---|---|---|---|
| 500 | 400 | — | — | 74,800 | 236,000 | 25,900 | 2,630 | 0.0084 | 6,270 | 217 | 8.2 |

TABLE 6B-continued

| Alloy specimen No. | Cooling rate (°C./hr) | Reheating temper-ature, (°C.) | Reheating time (hr) | Initial perme-ability $\mu_o$ | Maximum perme-ability $\mu_m$ | Effective perme-ability $\mu_e$, 1 kHz | Residual flux density (G) | Coercive force (Oe) | Saturation flux density (G) | Hardness Hv | Degree of abrasion (μm) |
|---|---|---|---|---|---|---|---|---|---|---|---|
| 510 | 800 | — | — | 53,000 | 138,200 | 19,000 | 3,050 | 0.0136 | 7,920 | 198 | 15.5 |
| 522 | 400 | — | — | 38,700 | 117,400 | 14,200 | 3,100 | 0.0225 | 8,100 | 170 | 18.0 |
| 534 | 800 | 400 | 1 | 47,500 | 168,000 | 22,600 | 3,070 | 0.0188 | 8,060 | 195 | 7.0 |
| 540 | 400 | 380 | 2 | 66,200 | 154,000 | 21,700 | 2,720 | 0.0103 | 6,560 | 220 | 7.2 |
| 547 | 400 | — | — | 58,900 | 172,500 | 23,000 | 2,910 | 0.0115 | 7,200 | 205 | 8.0 |
| 556 | 800 | — | — | 56,400 | 176,300 | 28,400 | 2,760 | 0.0130 | 6,940 | 196 | 9.1 |
| 563 | 400 | 420 | 2 | 81,500 | 264,000 | 29,200 | 2,840 | 0.0064 | 6,900 | 213 | 5.2 |
| 570 | 100 | — | — | 106,000 | 281,500 | 33,500 | 2.710 | 0.0032 | 6,830 | 207 | 5.0 |
| 581 | 50 | — | — | 82,400 | 247,400 | 28,700 | 2,460 | 0.0072 | 6,510 | 215 | 4.8 |
| 589 | 100 | 350 | 3 | 79,200 | 235,000 | 28,300 | 2,930 | 0.0078 | 7,340 | 217 | 4.7 |
| 596 | 400 | — | — | 63,500 | 182,600 | 25,100 | 2,870 | 0.0107 | 7,160 | 228 | 4.5 |
| 605 | 100 | — | — | 67,200 | 175,200 | 26,300 | 2,930 | 0.0103 | 7,730 | 196 | 5.1 |
| 613 | 400 | — | — | 77,900 | 218,600 | 28,600 | 2,350 | 0.0086 | 6,570 | 210 | 4.8 |
| 620 | 200 | — | — | 81,700 | 247,000 | 29,300 | 2,320 | 0.0072 | 6,230 | 193 | 5.2 |
| 627 | 100 | — | — | 96,700 | 284,000 | 31,100 | 2,170 | 0.0057 | 6,160 | 225 | 4.0 |
| 635 | 400 | 400 | 2 | 92,400 | 275,300 | 30,500 | 2,150 | 0.0060 | 5,800 | 220 | 4.2 |
| 640 | 100 | — | — | 64,800 | 238,000 | 26,800 | 2,950 | 0.0112 | 7,040 | 197 | 5.3 |
| 648 | 800 | — | — | 81,600 | 257,400 | 30,300 | 2,740 | 0.0067 | 6,580 | 212 | 4.6 |
| 655 | 50 | — | — | 83,300 | 262,800 | 31,000 | 2,180 | 0.0052 | 5,570 | 194 | 5.5 |

Now, the relationship between physical properties of the alloy of the invention and concentrations of specific ingredients will be described in detail, by referring to the figures of the accompanying drawings; here, the physical properties covering permeabilities, saturation flux densities, hardness, and degree of abrasion, while the specific ingredients being gold, silver, rhodium, gallium, indium, thallium, strontium, and barium.

Figure 2:
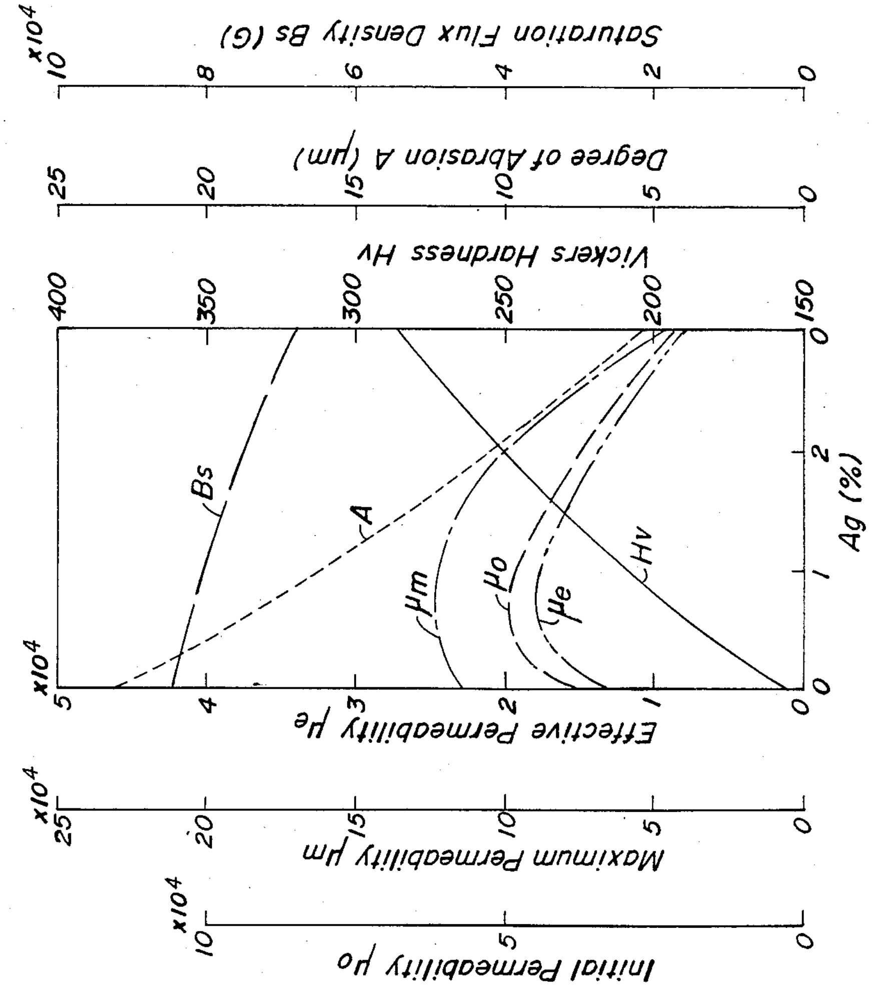
FIG. 2 is a graph similar to that of FIG. 1, showing the variation of the corresponding physical properties of (79.8% Ni)-Fe-(5% Nb)-Ag alloy for different concentrations of silver therein.
Figure 3:
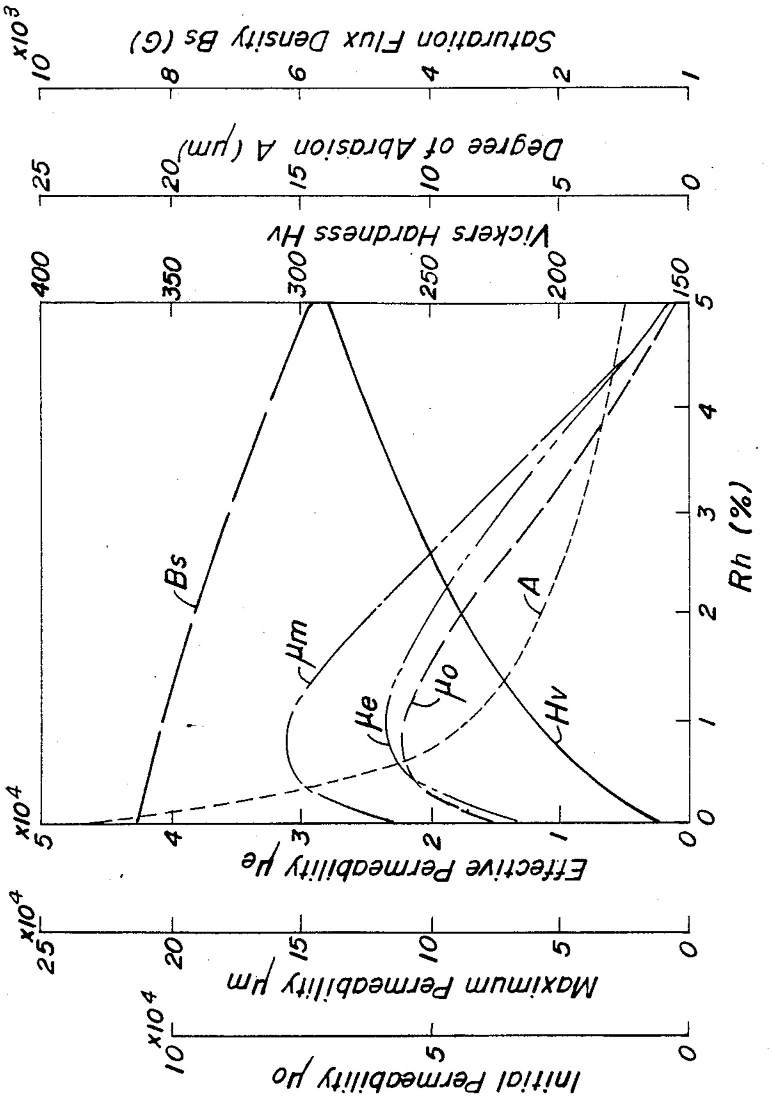
FIG. 3 is a graph similar to that of FIG. 1, showing the variation of the corresponding physical properties of (79.8% Ni)-Fe-(5% Nb)-Rh alloy for different concentrations of rhodium therein.
Figure 4:
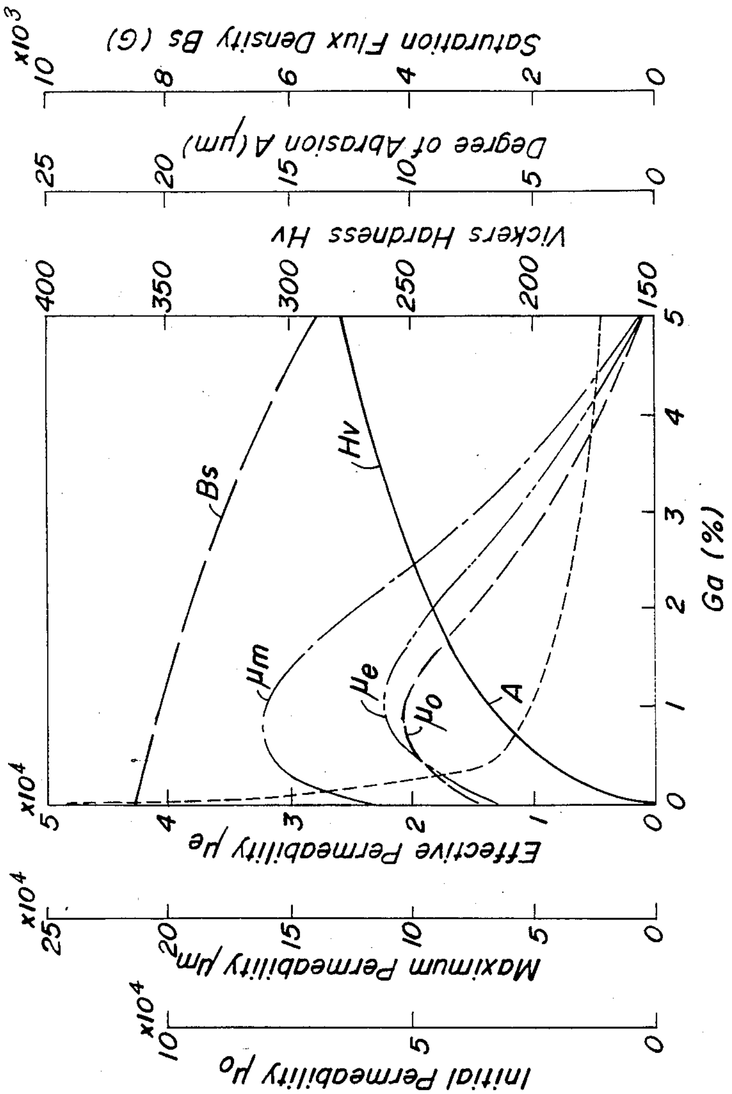
FIG. 4 is a graph similar to that of FIG. 1, showing the variation of the corresponding physical properties of (79.8% Ni)-Fe-(5% Nb)-Ga alloy for different concentrations of gallium therein.
Figure 5:
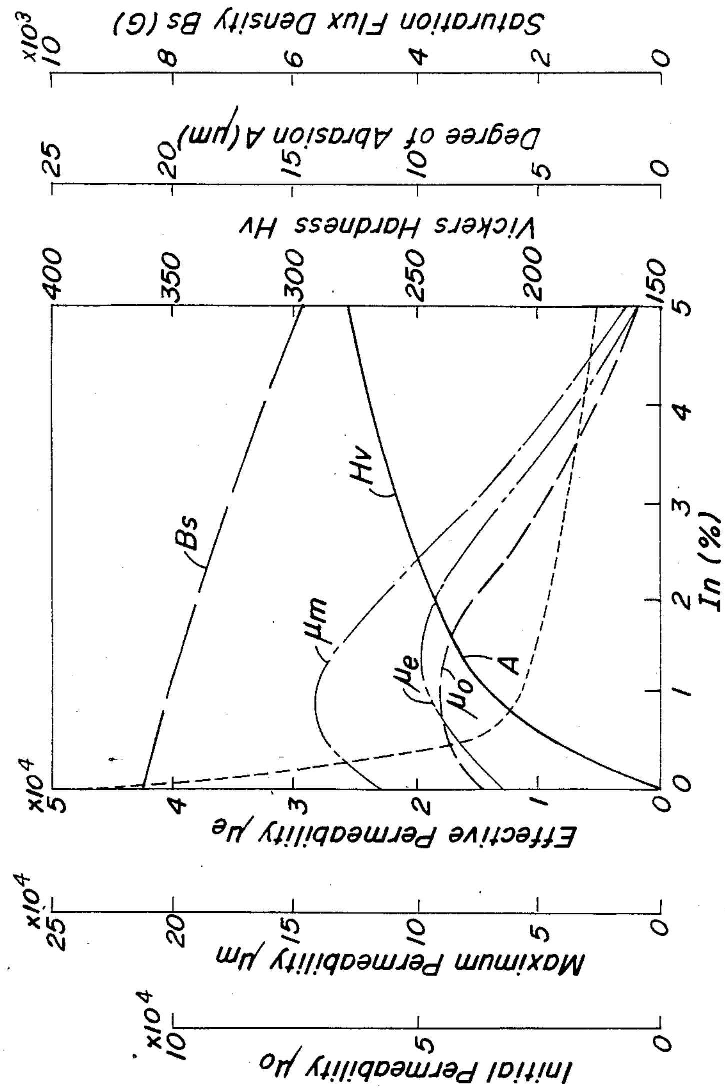
FIG. 5 is a graph similar to that of FIG. 1, showing the variation of the corresponding physical properties of (79.8% Ni)-Fe-(5% Nb)-In alloy for different concentrations of indium therein.
Figure 6:
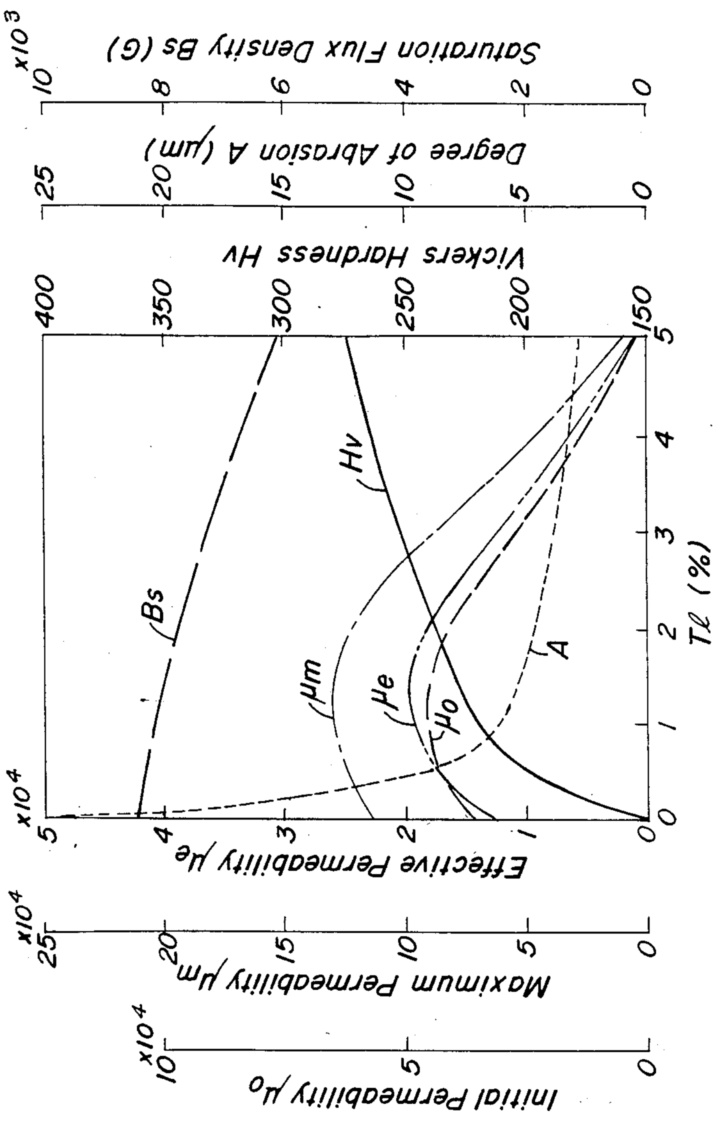
FIG. 6 is a graph similar to that of FIG. 1, showing the variation of the corresponding physical properties of (79.8% Ni)-Fe-(5% Nb)-Tl alloy for different concentrations of thallium therein.
Figure 7:
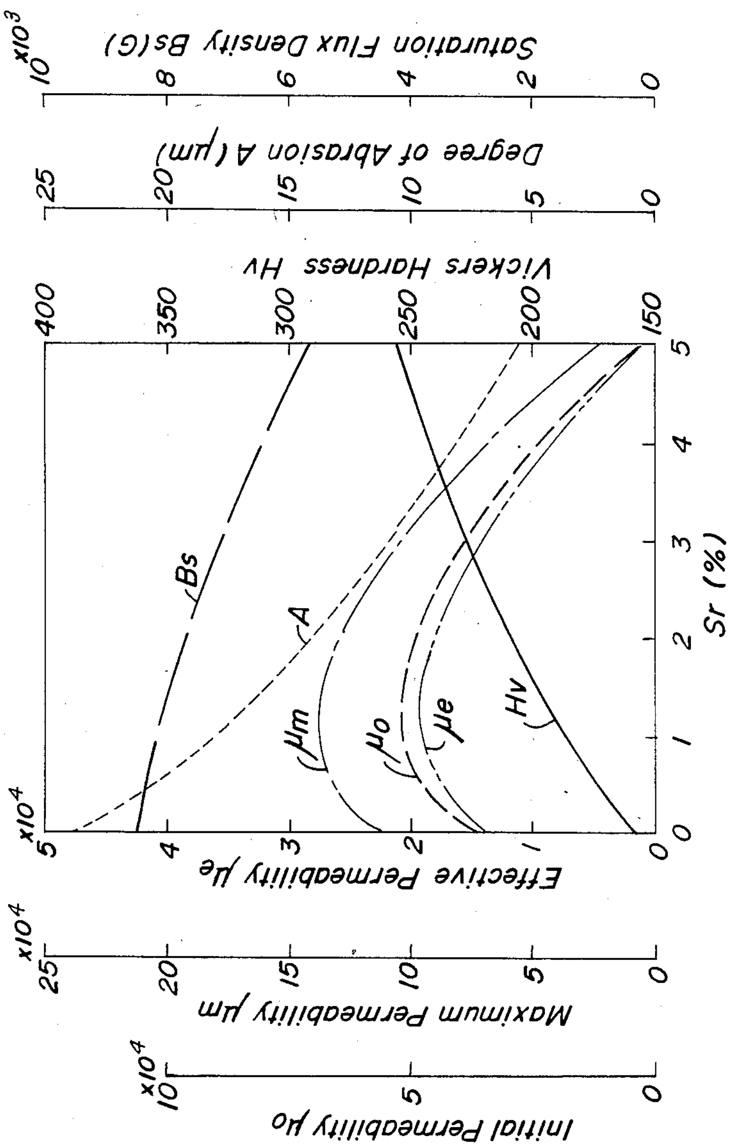
FIG. 7 is a graph similar to that of FIG. 1, showing the variation of the corresponding physical properties of (79.8% Ni)-Fe-(5% Nb)-Sr alloy for different concentrations of strontium therein.
Figure 8:
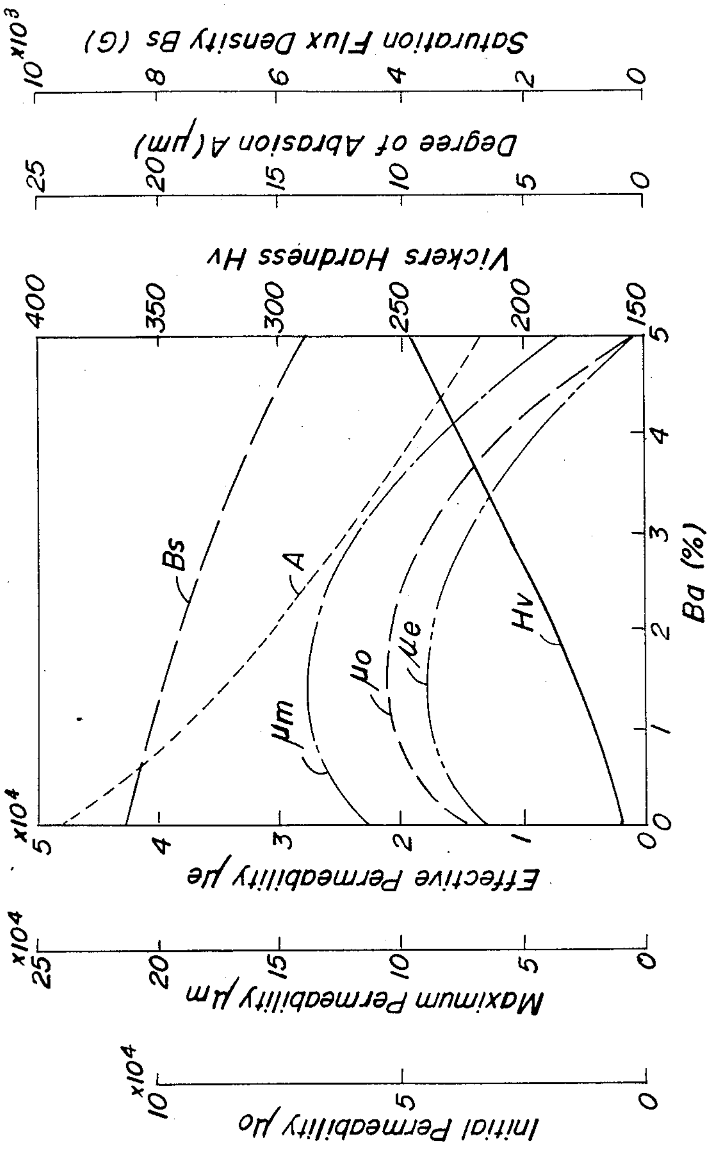
FIG. 8 is a graph similar to that of FIG. 1, showing the variation of the corresponding physical properties of (79.8% Ni)-Fe-(5% Nb)-Ba alloy for different concentrations of barium therein.

More specifically, the figures show how the amount of gold, silver, rhodium, gallium, indium, thallium, strontium, or barium in the alloy of the invention individually affects the properties of the alloy, such as initial permeability, maximum permeability, effective permeability, saturation flux density, hardness, and degree of abrasion; in which FIG. 1 is for alloys of (79.8% Ni)-Fe-(5% Nb)-Au, FIG. 2 is for alloys of (79.8% Ni)-Fe-(5% Nb)-Ag, FIG. 3 is for alloys of (79.8% Ni)-Fe-(5% Nb)-Rh, FIG. 4 is for alloys of (79.8% Ni)-Fe-(5% Nb)-Ga, FIG. 5 is for alloys of (79.8% Ni)-Fe-(5% Nb)-In, FIG. 6 is for alloys of (79.8% Ni)-Fe-(5% Nb)-Tl, FIG. 7 is for alloys of (79.8% Ni)-Fe-(5% Nb)-Sr, and FIG. 8 is for alloys of (79.8% Ni)-Fe-(5% Nb)-Ba.

In general, the hardness of the alloy of the invention considerably increases with the increase of the concentration of each of gold, silver, rhodium (an element of the platinum gold), gallium, indium, thallium, strontium, and barium, and the degree of abrasion noticeably decreases as the hardness increases. The figures also show that the initial permeability, the maximum permeability, and the effective permeability are improved by the addition of the above-mentioned specific elements.

It must be noted that if the concentration of any of gold, gallium, strontium, and barium exceeds 5% by weight, the saturation flux density becomes less than 5,000 G. In the case of more than 3% by weight of silver, more than 5% by weight of rhodium (an element of the platimum group), more than 5% by weight of indium, or more than 5% by weight of thallium, the forgeability, workability, and magnetic properties of the alloy become too low to be used in the magnetic recording-reproducing head.

The reason why the alloy of the invention has such high hardness appears to be in that the solid solution hardening of the Ni-Fe alloy matrix by the presence of niobium is enhanced by the addition of gold, silver, rhodium, gallium, indium, thallium, strontium, and/or barium, and that extremely hard fine particles of intermetallic compounds of Nb-(Au, Ag, Rh, Ga, In, Tl, Sr, Ba) system are crystallized in the matrix in response to such addition, so as to remarkably increase the hardness.

Although the starting materials used in the above experiments were metals with a high purity, various ferro alloys and mother alloys in the market can be used instead of such pure metals. The use of commercial ferro alloys or mother alloys tends to make the alloy of the invention somewhat brittle. Accordingly, it is necessary in the melting process of such starting alloy materials to add suitable deoxiding agents and desulfurizing agents, such as manganese, silicon, aluminum, titanium, boron, calcium alloys, magnesium alloys, and the like. The thorough deoxidization and desulfurization in the melting process improves the forgeability, hot workability, cold workability, and ductility of the alloy of the invention.

From the standpoint of providing proper recording and reproducing characteristics such as sensitivity, alloys for magnetic recording-reproducing heads is generally required to have an initial permeability of more than 3,000, a maximum permeability of more than 5,000, and a saturation flux density of more than 5,000 G. The alloy of the invention is suitable for magnetic recording-reproducing heads, because its initial permeability is larger than 3,000, its maximum permeability is larger than 5,000, and its saturation flux density is larger than 5,000 G.

To sum up, the alloy of the invention consists of nickel, iron, niobium, and at least one element selected from the group of gold, silver, platinum group elements, gallium, indium, aluminum, strontium, and barium, so that the alloy has very large values of the initial permeability, maximum permeability and effective permeability, and yet it has a high hardness and an excellent workability. Thus, alloy of the invention is highly suitable not only for magnetic recording-reproducing heads, but also for devices for video tape recording and other electric equipments. The alloy of the invention may contain 0.01–30% by weight in total of at least one element selected from the group of molybdenum, chromium, tungsten, titanium, vanadium, manganese, germanium, zirconium, rare earth elements, tantalum, beryllium, boron, aluminum, silicon, hafnium, tin, antimony, cobalt, and copper.

The scope of the alloy composition according to the present invention is as follows: namely, in percentage by weight, 60–86% of nickel, 0.5–14% of niobium, 0.001–5% in total of at least one element selected from the group consisting of less than 5% of gold, less than 3% of silver, less than 5% of platinum group elements, less than 5% of gallium, less than 5% of indium, less than 5% of thallium, less than 5% of strontium, and less than 5% of barium, and the remainder of iron; and optionally 0.01–30% in total of at least one auxiliary element selected from the group consisting of less than 8% of molybdenum, less than 7% of chromium, less than 10% of tungsten, less than 7% of titanium, less than 7% of vanadium, less than 10% of manganese, less than 7% of germanium, less than 5% of zirconium, less than 5% rare earth elements, less than 10% of tantalum, less than 3% beryllium, less than 1% of boron, less than 5% of aluminum, less than 5% of silicon, less than 5% of hafnium, less than 5% of tin, less than 5% of antimony, less than 10% of cobalt, and less than 25% of copper. The reason for restriction to such scope is in that the alloy composition in the above scope provides a high permeabilities, a large saturation flux density, a high hardness and good workability, as shown in the Tables and Figures.

On the other hand, the alloy composition outside the above scope of the invention results in low permeabilities, small saturation flux densities, low hardnesses, and inferior workabilities, so that alloy with the composition outside the above scope is not suitable for magnetic recording-reproducing heads. More particularly, if niobium is less than 0.5%, or if the total of gold, silver, platinum group elements, gallium, indium, thallium, strontium, and barium is less than 0.001%, the hardness becomes less than 130 and too low. If niobium is more than 14%, or if gold in excess of 5%, silver in excess of 3%, a platinum group element in excess of 5%, zinc in excess of 3%, gallium in excess of 5%, indium in excess of 5%, thallium in excess of 5%, strontium in excess of 5%, or barium in excess of 5% is used, the hardness becomes too high for forging and working and both the permeabilities and the saturation flux density become insufficient for magnetic recording-reproducing heads.

As to the auxiliary elements, if more than 8% of molybdenum, more than 7% of chromium, more than 10% of tungsten, more than 7% of titanium, more than 10% of vanadium, more than 10% of manganese, more than 7% of germanium, more than 5% of a rare earth element, more than 10% of cobalt, or more than 30% of copper is used, the initial permeability becomes below 3,000 or the maximum permeability becomes less than 5,000. If more than 5% of zirconium, more than 10% of tantalum, more than 3% of beryllium, more than 1% of boron, more than 5% of aluminum, more than 5% of silicon, more than 5% of hafnium, more than 5% of tin, or more than 5% of antimony is used, the alloy becomes hard to forge and work.

As can be seen from Tables 4A, 4B, 5A, 5B, 6A, and 6B, when any of the above-mentioned auxiliary elements is added in the alloy of Ni-Fe-Nb-(Au, Ag, platinum gold elements, Ga, In, Tl, Sr, Ba) system, certain improvement is achieved; namely, an increase in the initial permeability, maximum permeability and effective permeability, a decrease in the coercive force, and an increase in the hardness and abrasion resistivity. Thus, the addition of such auxiliary elements results in an improvement of magnetic properties, hardness and abrasion resistivity, so that the auxiliary elements have similar effects as the indispensable ingredients of the alloy of the invention.

What is claimed is:

1. A magnetic alloy for magnetic recording-reproducing head consisting of, in percentage by weight, major ingredients, 0.01–30% of at least one auxiliary ingredient, a small amount of impurities, and the remainder of iron; said major ingredients consisting of 60–86% of nickel (Ni), 0.5–14% of niobium (Nb), and 0.001–5% in sum of at least one element selected from the group consisting of less than 5% of gold (Au), less than 5% of strontium (Sr), and less than 5% of barium (Ba); said auxiliary ingredient being selected from the group consisting of less than 8% of molybdenum (Mo), less than 7% of chromium (Cr), less than 10% of tungsten (W), less than 7% of titanium (Ti), less than 7% of vanadium (V), less than 10% of manganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper; said alloy having an initial permeability of more than 3,000, a maximum permeability of more than 5,000, a saturation flux density of more than 5,000 G, and a Vickers hardness of more than 130.

2. A magnetic alloy for magnetic recording-reproducing head consisting of, in percentage by weight, major ingredients, 0.01–30% of at least one auxiliary ingredient, a small amount of impurities, and the remainder of iron; said major ingredients consisting of 60–86% of nickel (Ni), 0.5–14% of niobium (Nb), and 0.001–5% of gold (Au); said auxiliary ingredient being selected from the group consisting of less than 8% of molybdenum (Mo), less than 7% of chromium (Cr), less than 10% of tungsten (W), less than 7% of titanium (Ti), less than 7% of vanadium (V), less than 10% of maganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper; said alloy having an initial permeability of more than 3,000, a maximum permeability of more than 5,000, a saturation flux density of more than 5,000 G, and a Vickers hardness of more than 130.

3. A magnetic alloy for magnetic recording-reproducing head consisting of, in percentage by weight, major ingredients, 0.01–30% of at least one auxiliary ingredient, a small amount of impurities, and the remainder of iron; said major ingredients consisting of 60–86% of nickel (Ni), 0.5–14% of niobium (Nb), and 0.001–5% of strontium (Sr); said auxiliary ingredient being selected from the group consisting of less than 8% of molybdenum (Mo), less than 7% of chromium (Cr), less than 10% of tungsten (W), less than 7% of titanium (Ti), less than 7% of vanadium (V), less than 10% of manganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper; said alloy having an initial permeability of more than 3,000, a maximum permeability of more than 5,000, a saturation flux density of more than 5,000 G, and a Vickers hardness of more than 130.

4. A magnetic alloy for magnetic recording-reproducing head consisting of, in percentage by weight, major ingredients, 0.01–30% of at least one auxiliary ingredient, a small amount of impurities, and the remainder of iron; said major ingredients consisting of 60–86% of nickel (Ni), 0.5–14% of niobium (Nb), and 0.001–5% of barium (Ba); said auxiliary ingredient being selected from the group consisting of less than 8% of molybdenum (Mo), less than 7% of chromium (Cr), less than 10% of tungsten (W), less than 7% of titanium (Ti), less than 7% of vanadium (V), less than 10% of manganese (Mn), less than 7% of germanium (Ge), less than 5% of zirconium (Zr), less than 5% of rare earth elements, less than 10% of tantalum (Ta), less than 3% of beryllium (Be), less than 1% of boron (B), less than 5% of aluminum (Al), less than 5% of silicon (Si), less than 5% of hafnium (Hf), less than 5% of tin (Sn), less than 5% of antimony (Sb), less than 10% of cobalt (Co), and less than 25% of copper; said alloy having an initial permeability of more than 3,000, a maximum permeability of more than 5,000, a saturation flux density of more than 5,000 G, and a Vickers hardness of more than 130.

* * * * *